United States Patent
Sharma et al.

(10) Patent No.: US 7,280,479 B2
(45) Date of Patent: Oct. 9, 2007

(54) STATE MACHINE FOR PROVIDING DYNAMIC QUALITY OF SERVICE IN A CABLE NETWORK

(75) Inventors: Shantnu Sharma, Acton, MA (US); Vikrant Karan, Westborough, MA (US); Michael Mercurio, Boston, MA (US); Daniel Byron, Marlborough, MA (US)

(73) Assignee: ADC Broadband Access Systems, Inc., Westborough, MA (US)

( * ) Notice: Subject to any disclaimer, the term of this patent is extended or adjusted under 35 U.S.C. 154(b) by 916 days.

(21) Appl. No.: 10/683,079

(22) Filed: Oct. 10, 2003

(65) Prior Publication Data

US 2005/0078688 A1    Apr. 14, 2005

(51) Int. Cl.
 H04J 3/16   (2006.01)
 H04L 12/66   (2006.01)
 H04L 12/28   (2006.01)

(52) U.S. Cl. .................. 370/235; 370/352; 370/401

(58) Field of Classification Search .................. None
 See application file for complete search history.

(56) References Cited

U.S. PATENT DOCUMENTS

| | | | |
|---|---|---|---|
| 6,993,016 B1* | 1/2006 | Liva et al. | 370/356 |
| 7,002,995 B2* | 2/2006 | Chow et al. | 370/485 |
| 7,010,002 B2* | 3/2006 | Chow et al. | 370/485 |
| 7,107,326 B1* | 9/2006 | Fijolek et al. | 709/220 |
| 7,149,223 B2* | 12/2006 | Liva et al. | 370/401 |
| 2002/0136203 A1* | 9/2002 | Liva et al. | 370/352 |
| 2004/0181811 A1* | 9/2004 | Rakib | 725/122 |
| 2005/0010958 A1* | 1/2005 | Rakib et al. | 725/111 |
| 2007/0050835 A1* | 3/2007 | Liva et al. | 725/129 |

* cited by examiner

*Primary Examiner*—Andrew C. Lee
(74) *Attorney, Agent, or Firm*—Oren Reches

(57) ABSTRACT

A cable modem termination system includes a data over cable service interface specification (DOCSIS) subsystem that manages a flow associated with a gate and a gate manager (GM) that manages a state of the gate. When the flow is admitted by the DOCSIS subsystem, the DOCSIS subsystem signals to the GM to transition the state of the gate to a reserved state. The GM transitions the state of the gate to the reserved state when the DOCSIS subsystem signals to the GM to transition the state of the gate to the reserved state. When the flow is activated by the DOCSIS subsystem, the DOCSIS subsystem signals to the GM to transition the state of the gate to a committed state. The GM transitions the state of the gate to the committed state when the DOCSIS subsystem signals to the GM to transition the state of the gate to the committed state.

25 Claims, 11 Drawing Sheets

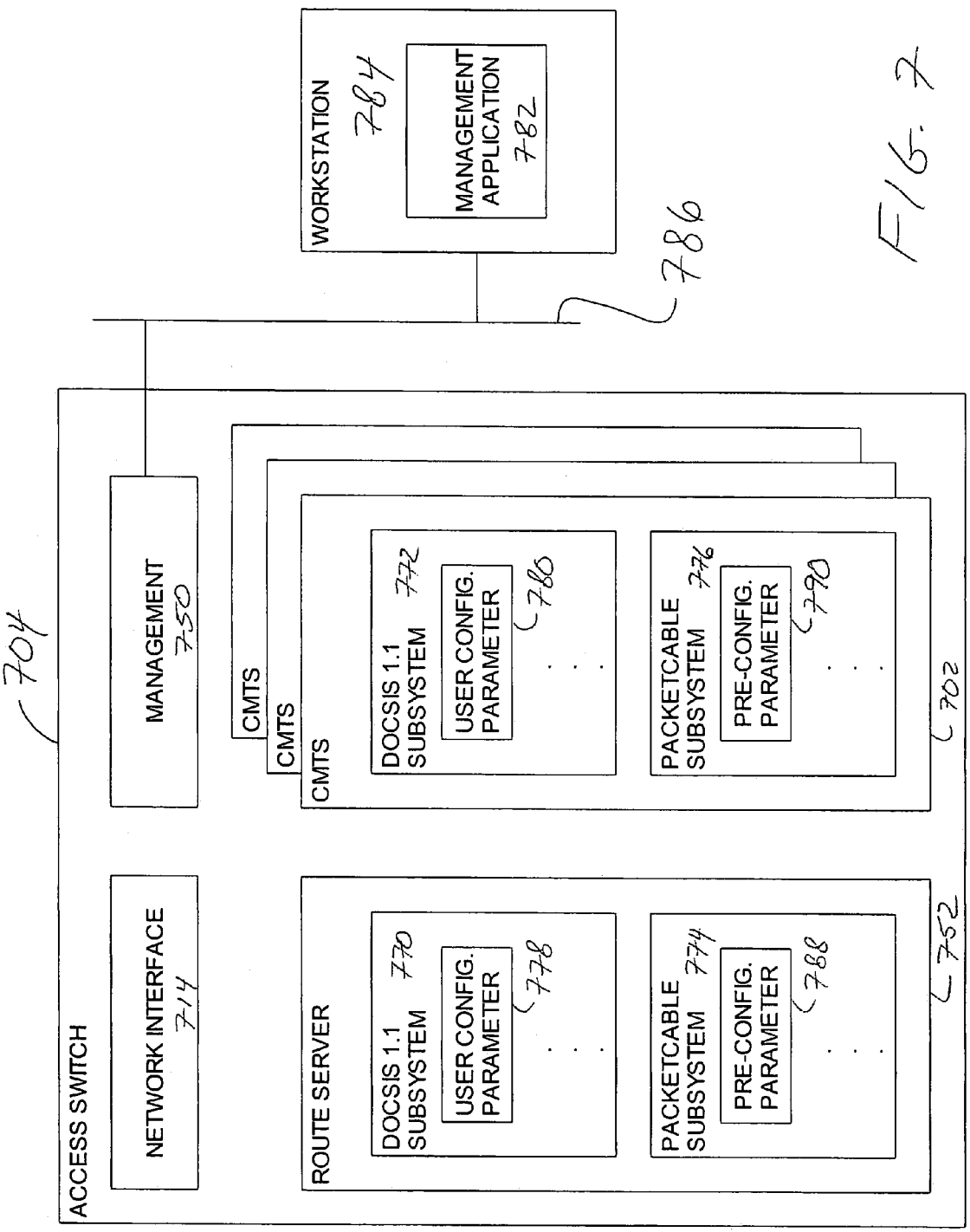

STATE MACHINE FOR PROVIDING DYNAMIC QUALITY OF SERVICE IN A CABLE NETWORK

TECHNICAL FIELD

The following description relates to telecommunications in general and to cable networks in particular.

BACKGROUND

The CABLELABS(R) consortium (referred to here as "CABLELABS") is a consortium of members of the cable industry. CABLELABS has promulgated a set of specifications and other documents (referred to here collectively as "Data Over Cable Service Interface Specification" or "DOCSIS") that define a bi-directional, internet protocol (IP) cable network (referred to here as a "DOCSIS network"). CABLELABS also has promulgated a set of specifications and other documents (referred to here collectively as "PACKETCABLE") that define an architecture for delivering real-time multimedia services (for example, voice telephony, voice conferencing, and gaming) over a DOCSIS network.

Among other things, PACKETCABLE specifies interfaces between the various elements of the PACKETCABLE architecture. One such interface is an "authorization interface" between a gate controller (GC) of a call management server (CMS) and a cable modem termination system (CMTS). This interface is also referred to as the "pkt-q6" interface.

SUMMARY

In one embodiment, a cable modem termination system includes a data over cable service interface specification subsystem that manages a flow associated with a gate and a gate manager that manages a state of the gate. When the flow is admitted by the data over cable service interface specification subsystem, the data over cable service interface specification subsystem signals to the gate manager to transition the state of the gate to a reserved state. The gate manager transitions the state of the gate to the reserved state when the data over cable service interface specification subsystem signals to the gate manager to transition the state of the gate to the reserved state. When the flow is activated by the data over cable service interface specification subsystem, the data over cable service interface specification subsystem signals to the gate manager to transition the state of the gate to a committed state. The gate manager transitions the state of the gate to the committed state when the data over cable service interface specification subsystem signals to the gate manager to transition the state of the gate to the committed state.

A method of managing the state of a gate includes admitting a flow by a data over cable service interface specification subsystem. The flow is associated with a gate. The method further includes signaling that the data over cable service interface specification subsystem has admitted the flow, transitioning the state of the gate to a reserved state in response to signaling that the data over cable service interface specification subsystem has admitted the flow, activating the flow by the data over cable service interface specification subsystem, signaling that the data over cable service interface specification subsystem has activated the flow, and transitioning the state of the gate to a committed state in response to signaling that the data over cable service interface specification subsystem has activated the flow.

An access switch that includes at least one cable modem termination system. The cable modem termination system, when coupled to a hybrid-fiber coaxial cable network, is in communication with a media terminal adapter. The cable modem termination system includes a gate manager executing thereon. The access switch further includes a route server, in communication with the cable modem termination system, that includes a common open policy service client executing on the route server. The access switch further includes a network interface module, in communication with the cable modem termination system and the route server, that, when the network interface module is coupled to a network, communicates common open policy service messages between the common open policy service client and a call management server included in the network. The cable modem termination system includes a data over cable service interface specification subsystem that manages a flow associated with a gate, and a gate manager that manages a state of the gate. When the flow is admitted by the data over cable service interface specification subsystem, the data over cable service interface specification subsystem signals to the gate manager to transition the state of the gate to a reserved state. The gate manager transitions the state of the gate to the reserved state when the data over cable service interface specification subsystem signals to the gate manager to transition the state of the gate to the reserved state. When the flow is activated by the data over cable service interface specification subsystem, the data over cable service interface specification subsystem signals to the gate manager to transition the state of the gate to a committed state. The gate manager transitions the state of the gate to the committed state when the data over cable service interface specification subsystem signals to the gate manager to transition the state of the gate to the committed state.

The details of one or more embodiments of the claimed invention are set forth in the accompanying drawings and the description below. Other features and advantages will become apparent from the description, the drawings, and the claims.

DRAWINGS

FIG. 7 is a block diagram of one embodiment of an access switch in which the PACKETCABLE functionality does not require any end user configuration.

Like reference numbers and designations in the various drawings indicate like elements.

DETAILED DESCRIPTION

Figure 1:
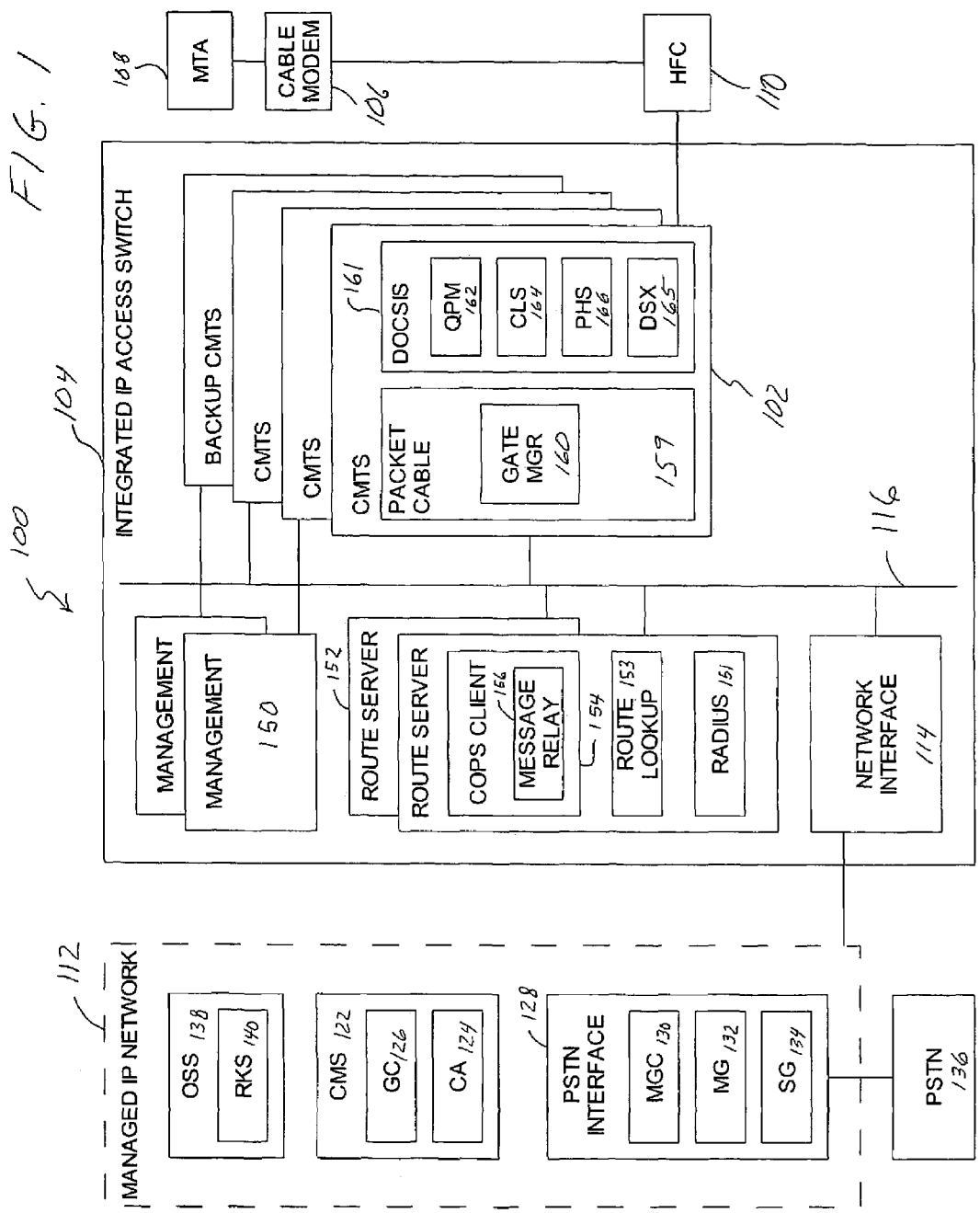
FIG. 1 is a block diagram of one embodiment of a cable network that supports multimedia services such as voice-over-IP telephony.

FIG. 1 is a block diagram of one embodiment of a cable network 100 that supports multimedia services such as voice-over-IP telephony. The particular embodiment shown in FIG. 1 supports the PACKETCABLE specification. In a voice-over-IP telephony call, two multimedia terminal adapters communicate over an internet protocol network such as the Internet. In some cases, both multimedia terminal adapters involved in the voice call are coupled to the same cable modem termination system. In other cases, the multimedia terminal adapters involved in the voice call are coupled to two different cable modem termination systems housed within the same access switch (and the same chassis). In other cases, the multimedia terminal adapters involved in the voice call are coupled to two different cable modem termination systems housed within different access switches. The following description describes the operation of one side of such a call. It is to be understood that a similar process is performed for the other end of the voice call.

In the embodiment shown in FIG. 1, cable network 100 includes an integrated internet protocol (IP) access switch 104 located in a cable head end or a regional hub. The integrated IP access switch 104 includes a chassis in which one or more cable modem termination systems 102 are housed. Each cable modem termination system (CMTS) 102 is coupled to multiple cable modems 106 (only one of which is shown in FIG. 1), each of which is located at a subscriber's premises (for example, a home or business). Each CMTS 102 is coupled to the multiple cable modems 106 using a hybrid/fiber coax (HFC) network 110.

In the embodiment shown in FIG. 1, each cable modem (CM) 106 is coupled to a media terminal adapter (MTA) 108, which is also located at the subscriber's premise. Each MTA 108 includes a subscriber-side interface that is connected to physical telephony equipment (for example, a telephone or fax machine) and a network-side signaling interface that is connected to a cable modem 106 in order to communicate with other network elements. MTA 108 provides the codecs and signaling and encapsulation functionality required for media transport and call signaling. In other embodiments, a cable modem and MTA are combined into a single device.

Each CMTS 102 is also coupled to an upstream network. For example, in the embodiment shown in FIG. 1, the upstream network includes a managed IP network 112. In one embodiment, the CMTS 102 is coupled to a network interface module 114 that is housed within the same integrated IP access switch 104 as the CMTS 102. In such an embodiment, the cable modem termination systems 102 housed within the integrated IP access switch 104 and the network interface module 114 communicate over a backplane 116, such as a mesh backplane. The network interface module 114 is connected to a router (not shown) to couple the network interface module 114 to the managed IP network 112. In other embodiments, the CMTS 102 is coupled to an upstream network in other ways.

In the embodiment shown in FIG. 1, the managed network IP network 112 includes various network elements that support functionality required by PACKETCABLE such as call signaling, provisioning, and QOS establishment. In the embodiment shown in FIG. 1, the managed IP network 112 includes a call management server (CMS) 122. The CMS 122 includes a call agent (CA) 124 to provide telephony signaling services and a gate controller (GC) 126 that coordinates all quality-of-service (QOS) authorization and control.

Managed IP network 112 also includes a public switched telephone network (PSTN) interface 128 or PSTN gateway. The PSTN interface 128 includes a media gateway controller (MGC) 130, a media gateway (MG) 132, and a signaling gateway (SG) 134. The MGC 130 is the overall controller for the PSTN interface 128. The MGC 130 receives and mediates call-signaling information between the cable network 100 and a PSTN 136. The MGC 130 maintains and controls the overall call state for calls requiring PSTN interconnection. The MG 132 provides bearer connectivity between the PSTN 136 and the managed IP network 112. The MGC 130 also instructs the MG 132 to detect and to generate events and signals relevant to the call state known to the MGC 128. The SG 134 sends and receives circuit-switched network signaling at the edge of the managed IP network 112. In one embodiment, the SG 134 supports non-facility associated signaling in the form of signaling system 7 (SS7).

The managed IP network 112 communicates with various components of an operation support system (OSS) 138. For example, a record keeping server (RKS) 140 included in OSS 138 receives PACKETCABLE event messages from other PACKETCABLE network elements such as the CMS 122, CMTS 102, and MGC 130. The RKS 140 assembles the event messages into coherent sets, or call detail records (CDRs), which are then made available to other back office systems, such as billing, fraud detection, and other systems. Further information regarding the components of a managed IP network 112 are found in the PACKETCABLE specifications and documents.

The PACKETCABLE Dynamic Quality-of-Service Specification defines an "authorization interface" (also referred to as the "PKT-Q6" interface) between the GC 126 and a CMTS 102. The GC 126 of the CMS 122 uses the Common Open Policy Service (COPS) protocol to manipulate "gates" that reside logically on the CMTS 102. A "gate" is a policy control entity implemented at the CMTS 102 to control access to a QOS-guaranteed flow in the cable network 100. In the embodiment shown in FIG. 1, each CMTS 102 includes a multimedia service (that is, PACKETCABLE) subsystem 159 and a DOCSIS 1.1 subsystem 161. The PACKETCABLE subsystem 159 includes a gate manager 160 that manages the gates and processes the related packets that are communicated between the CMTS 102 and the CMS 122. A gate is unidirectional and controls access to such a flow in either the upstream or downstream direction. A gate includes a packet classifier, a traffic policer, and an interface to an entity that gathers statistics and events (all of these components are specified in the DOCSIS 1.1 standard). The gate is designed to ensure that only those sessions that have been authorized by the service provider receive high QOS service.

The gate manager 160 interacts with the DOCSIS 1.1 subsystem 161 of the CMTS 102. The DOCSIS 1.1 subsystem 161 includes the functionality of the CMTS 102 that manages QOS, that manages classifiers, and implements packet header suppression. For example, in the embodiment shown in FIG. 1, the DOCSIS 1.1 subsystem 161 includes a QOS policy manager subsystem (QPM) 162 that provides general admission control, a classifier subsystem (CLS) 164 that manages any classifiers necessary for a gate, a protocol header suppression subsystem (PHS) 166 for assuring room for any PHS rules necessary for a gate, and a DOCSIS 1.1 QOS signaling mechanism (referred to here as "DSX") 165 for processing Dynamic Service Add, Change and Delete messages. As described below in connection with FIG. 6, these subsystems manage the underlying DOCSIS 1.1 flows on which the PACKETCABLE gates (which are managed by the gate manager 160) are based. In other words, with respect to gate transition functionality, the gate manager 160 virtualizes the functionality provided by the underlying DOCSIS 1.1 subsystems in order to communicate with a COPS client 154, which in turn communicates the gate controller 126.

In the embodiment shown in FIG. 1, the integrated IP access switch 104 also houses additional modules, such as a management module 150 and a route server 152. Two management modules 150 are used in such an embodiment, with one management module 150 serving as a primary management module and the other module serving as a backup or secondary management module. The management modules 150 monitor and control the operation of the other modules (for example, CMTSs 102, network interface module 114, route server 152) housed within the integrated IP access switch 104. The management modules 150 and the route server 152 communicate with one another and the other modules over the backplane 116.

The route server 152 includes a route lookup subsystem 153 that provides routing functionality for the modules housed within the integrated IP access switch 104. In addition, in the embodiment shown in FIG. 1, the route server 152 also includes a common open policy service (COPS) protocol client 154 (also referred to here as the "COPS client" 154). The COPS client 154 communicates with the call management server 122. In the embodiment shown in FIG. 1, the COPS client 154 communicates with a COPS server 160 that is a part of the gate controller 126. The COPS server 160 includes a policy database 162 in which information used to make admission control decisions is stored. The COPS client 154 and the COPS server 160 communicate using transport control protocol (TCP). The route server 150 also includes a Remote Authentication Dial-In User Service (RADIUS) interface 151. The RADIUS interface 151 provides an interface to the RKS 140 of the OSS 138.

The COPS client 154 listens for new COPS connections, establishes and maintains COPS connections, parses incoming COPS messages for errors, passes all GATE control messages to an appropriate CMTS 102. The COPS client 154 also receives outgoing messages from the CMTSs 102, formats appropriate COPS messages for the GC 126 based on the received messages, and forwards the outgoing COPS message to the GC 126. In effect, the COPS client 154 acts as a COPS proxy between the GC 126 and the CMTSs 102.

In one embodiment, the COPS client 154 maintains no state or information about GATEs. All such GATE information is maintained by the various CMTSs 102, as described below. In order to facilitate a clean delineation between COPS function and GATE function, the COPS client 154 parses out all GATE information from COPS messages that the COPS client 154 receives. The COPS client 154 passes the parsed GATE information to an appropriate CMTS 102. Messages sent between the CMTS 102 and the COPS client 154 are formatted in a canonical form. In the embodiment shown in FIG. 1, the COPS client 154 includes a message relay 156 that performs the actual communication between the COPS client 154 and the various cable modem termination systems 102.

A gate identifier (also known as a "gate ID") is a unique 32-bit identifier that is locally allocated by the CMTS 102 where an associated gate or gates reside. PACKETCABLE specifies that up to two gates may share the same gate ID. Typically, a gate ID identifies and is associated with a single upstream flow and a single downstream flow and corresponds to a single multi-media session. PACKETCABLE specifies that the gate ID must be unique among all current gates allocated by a given CMTS 102. The value of the 32-bit quantity should not be chosen from a set of small integers, since possession of the gate ID value is a key element in the authentication of the COMMIT messages from, the MTA (one embodiment of which is described below). PACKETCABLE indicates that the CMTS 102 should attempt to minimize the possibility of gate ID ambiguities by ensuring that no gate ID gets reused within three minutes of its prior closure or deletion.

Advantages of the architecture described here include the following. By incorporating the gate manager 160 in the CMTS 102, when a CMTS 102 receives a Dynamic Service Delete message, the gate manager 160 is able to delete the gate indicated by the message without performing any special communications with the COPS client 154 executing on the route server 152.

Moreover, in the embodiment shown in FIG. 1, in the event that the primary route server 152 goes down, the secondary route server 152 will take over. In such a situation, the TCP connection between the CMS 122 and the primary route server 152 will go down. The CMS 122 will reestablish a new TCP connection with the new route server 152 using the same IP address. The CMS 122 maintains its previously allocated gates and assumes those previously allocated gates are still operating on the CMTS 102. A new COPS client 154 is executed on the secondary route server 152. The new COPS client 154 takes over communication responsibilities with the gate controller 126. Since the gate ID knowledge is maintained by the gate managers 160 executing on the cable modem termination systems 102, no additional recovery processing is necessary in order for the new COPS client 154 to take over. The COPS client 154 is able to determine which CMTS 102 is associated with a particular gate ID based on the slot number that is embedded in the gate ID.

Similarly, when the primary route server 152 is rebooted, the COPS client 154 executing on that route server 152 will lose the current state information. When the route server 152 finishes rebooting, the CMS 122 will reestablish a TCP connection with the route server 152. The CMS 122 maintains its previously allocated gates and assumes those previously allocated gates are still operating on the CMTS 102. Again, since the gate ID knowledge is maintained by the gate managers 160 executing on the cable modem termination systems 102, no additional recovery processing is necessary in order for the COPS client 154 on the rebooted route server 152 to restart. The COPS client 154 is able to determine which CMTS 102 is associated with a particular gate ID based on the slot number that is embedded in the gate ID.

In one embodiment of the integrated IP access switch 104 shown in FIG. 1, in the event that a primary CMTS 102 goes down and a secondary CMTS 102 takes over, the secondary CMTS 102 forces all cable modems serviced by the secondary CMTS 102 (that is, the cable modems previously serviced by the failed primary CMTS 102) are forced to reregister with the secondary CMTS 102. When the cable modems reregister, the CMS 122 will be informed of this action at the MTA, and the CMS 122 will subsequently remove the affected Gates in the secondary CMTS 102 via Gate Inform and Gate Delete COPS messages sent to the COPS client 154. When the COPS client 154 receives the Gate messages, the COPS client 154 identifies that a protection switch has occurred and forwards these messages the secondary CMTS 102. This requires the COPS client 154 to determine if a protection switch has occurred before sending such a message based on the embedded slot number in the gate ID. In one implementation, a level of indirection is provided in the slot number so that this can be handled.

In one embodiment of the access switch 104, the PACK-ETCABLE functionality is implemented in a manner that does not require any configuration. FIG. 7 is a block diagram of one embodiment of an access switch 704 in which the PACKETCABLE functionality does not require any end user configuration. The access switch 704 includes a route server 752 (in one embodiment, implemented using a route server 152 of the type shown in FIG. 1) and one or more cable modem termination systems 702 (in one embodiment, implemented using one or more cable modem termination systems 102 of the type shown in FIG. 1).

In such an embodiment, each of the route server 752 and the cable modem termination systems 702 include a DOCSIS 1.1 service subsystem 770 and 772, respectively, and a PACKETCABLE (or other multimedia) service subsystem 774 and 776, respectively. For example, the DOCSIS 1.1. service subsystem 770 of the route server 752 includes the underlying DOCSIS packet routing functionality (for example, the route lookup subsystem 153 described above in connection with FIG. 1) and the DOCSIS service subsystem 772 of each cable modem termination system 702 includes, for example, the QPM 162, CLS 164, PHS 164, and DSX 165 subsystems described above in connection with FIG. 1. The access switch 704 includes a network interface module 714 (for example, the network interface module 114 described above in connection with FIG. 1) for coupling the access switch 704 to a managed IP network.

In the embodiment shown in FIG. 7, each of the DOCSIS 1.1 subsystems 770 and 772 include at least one user configurable parameter 778 and 780, respectively. An end user (for example, a technician for a cable service provider or cable equipment maker) configures the DOCSIS 1.1 service subsystems 770 and 772 by viewing and modifying the contents of the one or more user configurable parameter 778 and 780. For example, in the embodiment shown in FIG. 7, a management application 782 executing a workstation 784 is coupled to the access switch 704 (for example, over a local area network 786 and management module 750). The end user uses the management application 782 to view and modify the user configurable parameters 778 and 780.

The PACKETCABLE service subsystems 774 and 776 include one or more pre-configured parameters 788 and 790, respectively. Appropriate values for the pre-configured parameters 788 and 790 are supplied by the manufacturer of the route server 752 and the cable modem termination system 702, for example, during the manufacturing process or during a system upgrade (for example, via a software or firmware upgrade).

In operation, the access switch 704 is configured by an end user to provide DOCSIS 1.1 service by using the management application 782 to view and modify the user configurable parameters 778 and 780. After such configuration is done, the PACKETCABLE functionality is automatically provided with no additional configuration beyond that required to provide DOCSIS 1.1 service. This is because the PACKETCABLE service subsystems 774 and 776 are preconfigured. This improves the ease with which PACKETCABLE functionality can be incorporated into a cable network.

Figure 2:
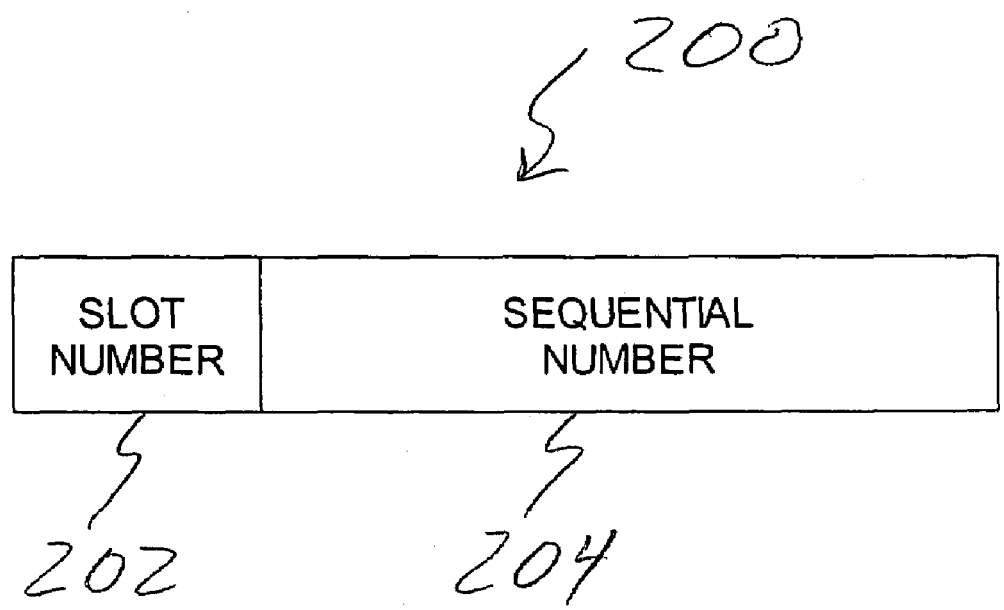
FIG. 2 illustrates one approach to generating a gate ID.

FIG. 2 illustrates one approach to generating a gate ID. In one embodiment, illustrated in FIG. 2, the gate ID 200 includes two parts. The first part 202 is an 8-bit slot number that corresponds to the slot in which the CMTS 102 that generates gate ID is inserted. The second part 204 is a 24-bit sequential number. Each time that a gate ID is generated for a particular CMTS 102, the gate ID that was last created is incremented by one (or wrapping around to zero when the last gate ID is equal to the maximum 24-bit integer value). With such an embodiment, a map or other data structure is not needed in order to identify which CMTS 102 is associated with a particular gate ID. Such a determination is made by referencing the first part 202 of the gate ID 200. Moreover, with such an embodiment, a map or other data structure is not needed in order to associate a gate ID with the data structures for that gate ID and the associated gates. Instead, in such an embodiment, the second part 204 of the gate ID 200 is used as an index into an array in which such gate ID and gate data structures or references (for example, pointers) to such data structures are stored. In an alternate embodiment, the gate ID includes a third part that identifies whether the other end of the call terminates on a CMTS 102 located within the same integrated IP access switch 104 as the CMTS 102 that generated the gate ID or terminates on a CMTS 102 located outside of that integrated IP access switch 104.

Figure 3A:
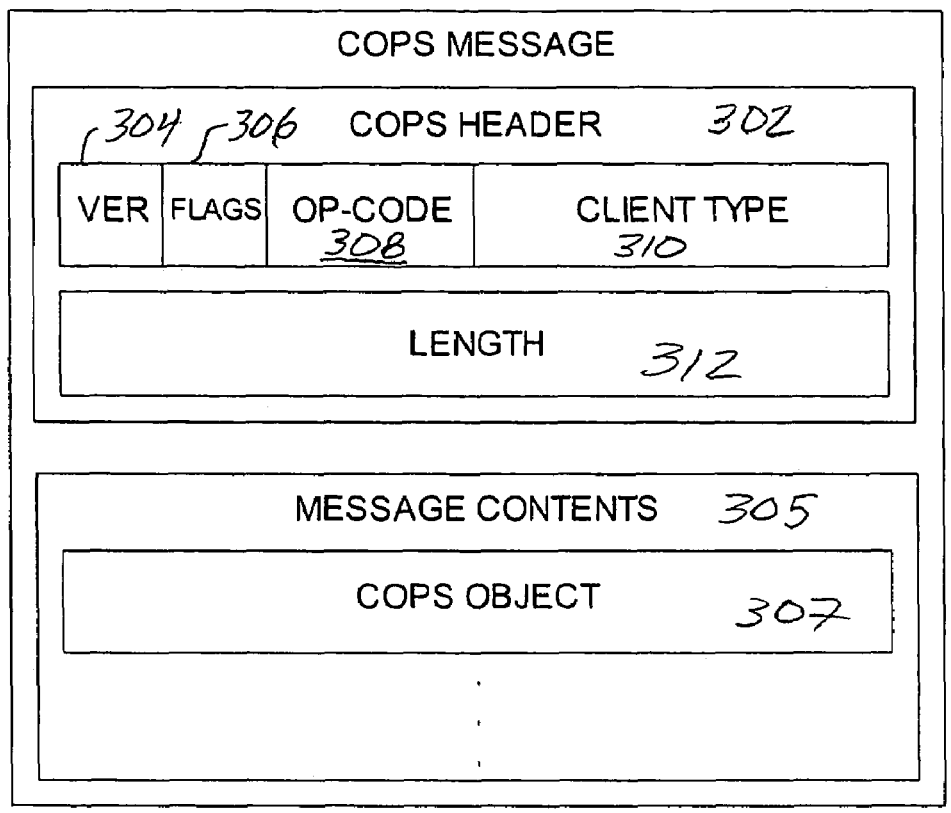
FIGS. 3A-3C are block diagrams illustrating the format of COPS messages.

The COPS client 154 exchanges COPS messages with the GC 126 of the CMS 122 and exchanges message (referred to here as MR messages) with the various gate managers 160 running on respective cable modem termination systems 102 housed within the integrated IP access switch 104. FIG. 3A is a block diagram illustrating the format of a COPS message 300. COPS message 300 includes a header 302 followed by the message contents 305, which includes a number of COPS objects 307. The COPS header 302 includes version field 304, a flags field 306, an op-code field 308, a client-type field 310, and a message length field 312. The version field 304 is a 4-bit field used to specify the COPS version number. In one implementation, this value is set to 1. The flags field 306 is a 4-bit field that is set when the current message is solicited by another COPS message. The op-code field 308 is an 8-bit field used to specify a COPS operation to be performed. The COPS operations that are used in the PACKETCABLE specification are: Request (REQ), Decision (DEC), Report-State (RPT), Client-Open (OPN), Client-Accept (CAT), Client-Close (CLS), and Keep-Alive (KA). The client-type field 310 is a 16-bit field that specifies identifies the policy client. For PACKETCABLE messages other than keep alive messages, the client-type field 310 is set to 8005 (hexadecimal). For keep alive messages, the client-type field 310 is set to zero. The message-length field 312 includes the size of message in bytes, which includes the size of the COPS header 302 and the size of all the objects 307.

Figure 3B:
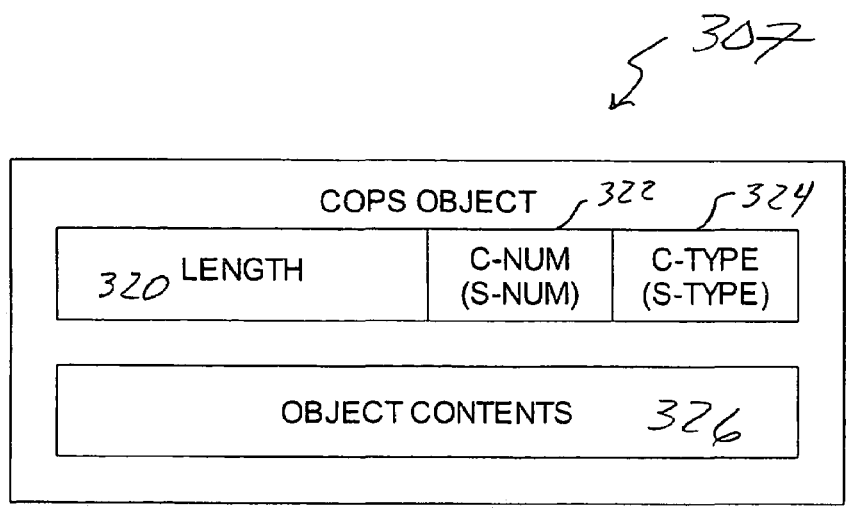
Figure 3C:
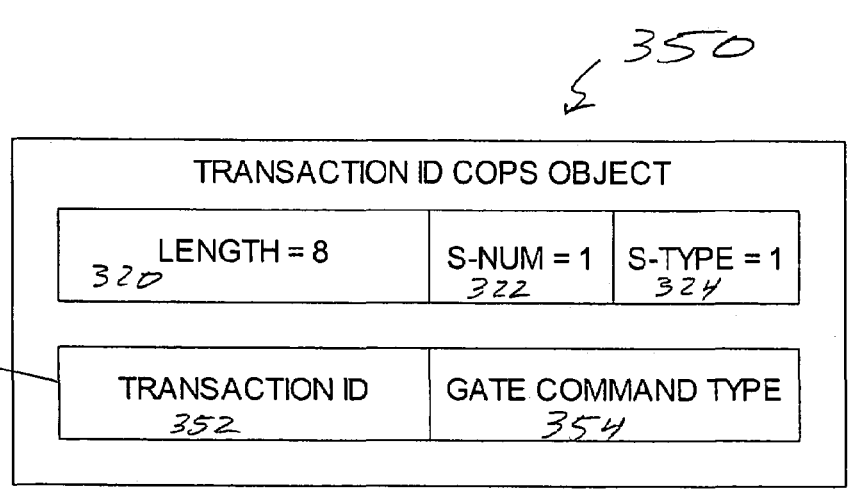

FIG. 3B is block diagram illustrating the common format of COPS objects. The format of the COPS objects used in PACKETCABLE applications are specified in the PACKETCABLE Dynamic Quality-of-Service Specification, PKT-SP-DQOS-I06-030415 (the "DQOS Spec"). A COPS object 304 includes a length field 320, a C-number field 322, a C-type field 324, and the actual contents 326 of the object 304. The length field 320 is a 16-bit field that specifies the number of octets that are included in the object. The C-number field 322 is an 8-bit field that identifies the class of information contained in the object. For PACKETCABLE, the following classes are used: handle, decision, error, client specific information, keep-alive-timer, report type, and policy enforcement point (PEP) identification. The C-type field 324 is an 8-bit field that identifies the subtype or version of the information contained in the object. The contents 326 of the various COPS objects are described in the DQOS Spec. For example, one type of COPS object is a transaction ID COPS object 350, which is shown in FIG. 3C. The length field 320 of a transaction ID COPS object 350 is set to 8 octets, which is the length in octets of the transaction ID COPS object 350. The C-number field 322 and a C-type field 324 of a transaction ID COPS object 350 are set to 1 and 1, respectively. The contents 326 of a transaction ID COPS object 350 includes a 16-bit transaction identifier field 352 that may be used by the gate controller 126 to match responses to commands. The transaction ID COPS object 352 also includes a 16-bit gate command type field 354 which is used to indicate what type of gate command is to be performed in response to the COPS message in which the transaction ID COPS object 352 is included. The gate commands specified in the PACKET-CABLE specifications include GATE-ALLOC, GATE-ALLOC-ACK, GATE-ALLOC-ERR, GATE-SET, GATE-SET-ACK, GATE-SET-ERR, GATE-INFO, GATE-INFO-ACK, GATE-INFO-ERR, GATE-DELETE, GATE-DELETE-ACK, GATE-DELETE-ERR, GATE-OPEN, and GATE-CLOSE gate commands.

Figure 4A:
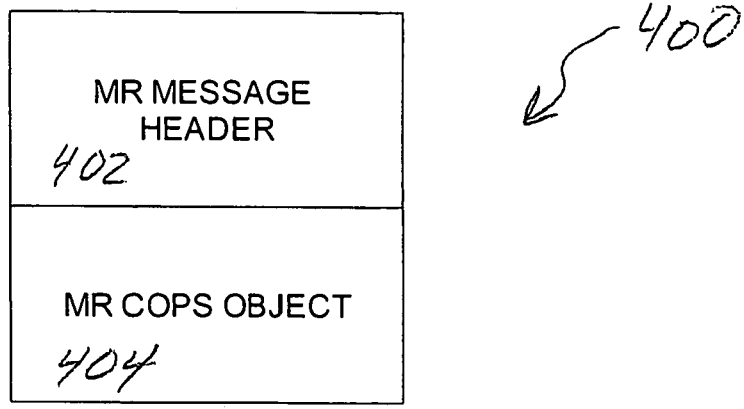
FIGS. 4A-4H are block diagrams of one embodiment of message relay messages.

FIG. 4A is a block diagram of one embodiment of a message relay (MR) message 400. MR messages 400, in one embodiment, are encapsulated in packets or messages of the type that are communicated between the various modules of the integrated IP access switch 104. The message relay message 400 includes a message relay header 402 and a message relay COPS object 404.

Figure 4B:
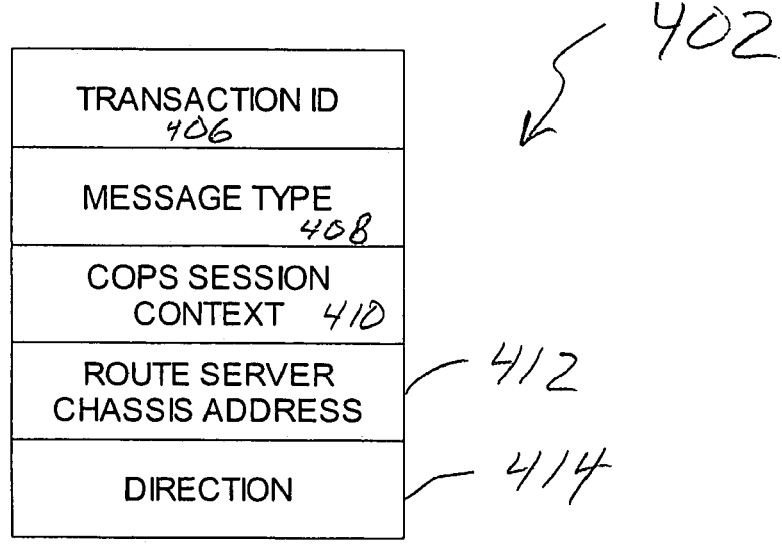

FIG. 4B is block diagram of one embodiment of a message relay message header 402. Message Relay message header 402 includes a transaction identification (ID) field 406 contains a token that is used by the GC 126 to match responses from the COPS Client 154 and the CMTS 102 to previous requests. The COPS client 154, in MR messages sent from the COPS client 154 to the gate manager 160, uses the transaction ID supplied in a corresponding COPS message received from the GC 126. The gate manager 160, in MR messages sent from the gate manager 160 to the COPS client 154, uses the transaction ID supplied in a corresponding MR message received from the COPS client 154.

The MR message header 402 also includes a message type field 408 that indicates to what type of COPS message the MR message corresponds. For example, in one such embodiment, the message type field 408 contains a value corresponding to one of the following COPS message types: GATE-ALLOC, GATE-ALLOC-ACK, GATE-ALLOC-ERR, GATE-SET, GATE-SET-ACK, GATE-SET-ERR, GATE-INFO, GATE-INFO-ACK, GATE-INFO-ERR, GATE-DELETE, GATE-DELETE-ACK, or GATE-DELETE-ERR.

The MR message header 402 also includes a COPS session context field 410 that contains a unique identifier for each existing COPS connection between route server 152 and the CMS 122. This identifier is chosen by the route server 152 to authenticate messages being exchanged from various call management servers 122. The COPS client 154, in MR messages to be sent to the gate manager 160, populates the COPS session context field 410 based on the respective COPS connection identifier information. The gate manager 160, in MR messages sent from the gate manager 160 to the COPS client 154, uses the COPS session context supplied in a corresponding MR message received from the COPS client 154.

The MR message header 402 also includes a route server chassis address field 412. The route server chassis address field 412 contains an address of the card (or other module) on which the COPS client 154 executes. In the embodiment, shown in FIG. 1, the card on which the COPS client 154 executes is the route server 152. For example, in one such embodiment implemented using an embodiment of a chassis of the type described in the '039 Application, the route server chassis address filed 412 includes a fabric interface address (FIA) that, for example, specifies the chassis, the slot, and the port for the route server 152 on which the COPS client 154 executes. The COPS client 154, in MR messages sent from the COPS client 154 to the gate manager 160, populates the contents of the route server chassis address field 412 with the chassis address of the card (for example, the route server) on which the COPS client 154 executes. The gate manager 160, in MR messages sent from the gate manager 160 to the COPS client 154, uses route server chassis address supplied in a corresponding MR message received from the COPS client 154.

The MR message header 402 also includes a flow direction field 414 that indicates the direction (for example, upstream, downstream, or both) of the flow or flows associated with the particular message. The COPS client 154 and the gate manager 160 set the flow direction field based on the direction of the flow or flows associated with the particular message. MR message also includes CMS IP address information that provides a security mechanism such that only a particular CMS can operate on that CMS's respective gates.

Figure 4C:
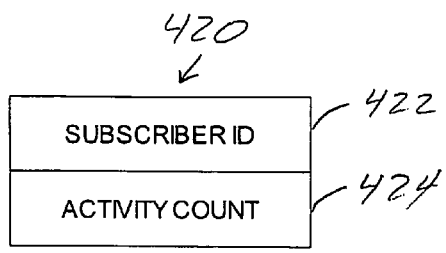

The format of the message relay COPS object 404, shown in FIG. 4A, depends on the message type of the particular MR message 400. FIG. 4C is a block diagram of one embodiment of a GATE-ALLOC object 420. GATE ALLOC object 420 is used for MR messages 400 that correspond to a GATE-ALLOC message, which is sent from the COPS client 154 to the gate manager 160. The GATE-ALLOC object 420 includes a subscriber ID field 422 and an activity count field 424. The subscriber ID field 422 identifies the subscriber associated with the particular allocation request. When used in a GATE-ALLOC message, the activity count field 424 specifies the maximum number of gates that can be simultaneously allocated to the subscriber associated with the subscriber ID in the subscriber ID field 422.

Figure 4D:
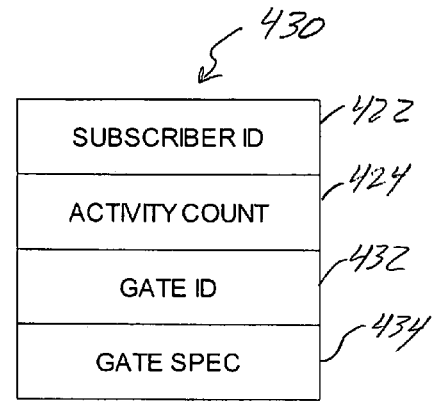

FIG. 4D is a block diagram of one embodiment of a GATE-SET object 430. GATE-SET object 430 is used for MR messages 400 that correspond to a GATE-SET message, which is sent from the COPS client 154 to the gate manager 160. The GATE-SET object 430 includes a subscriber ID field 422 and an activity count field 424, which contain the same information as described above in connection the GATE-ALLOC object 420. The GATE-SET object 430 may also include a gate ID field 432 and a gate spec field 434. The gate ID field 432 contains the gate ID of the gate referenced by the message. The gate spec field 434 is defined in the PACKETCABLE Dynamic Quality-of-Service Specification, PKT-SP-DQOS-I06-030415 (the "DQOS Spec").

Figure 4E:
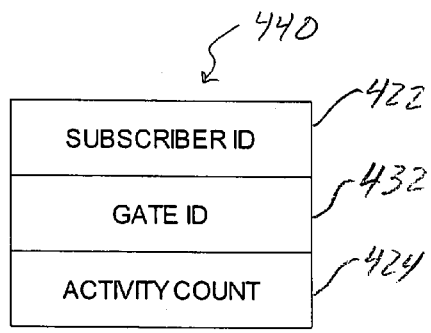

FIG. 4E is a block diagram of one embodiment of a GATE-ALLOC/SET-ACK object 440. GATE-ALLOC/SET-ACK object 440 is used for MR messages 400 that correspond to a GATE-ALLOC-ACK or a GATE-SET-ACK message, which are sent by the gate manager 160 to the COPS client 154. The GATE-ALLOC/SET-ACK object 440 that includes a subscriber ID field 422 that identifies the subscriber associated with the message. The GATE-ALLOC/SET-ACK object 440 also includes a gate ID field 432 that contains the gate ID that was created by the gate manager 160 in response to a corresponding previous GATE-SET or GATE-ALLOC MR message. The GATE-ALLOC/SET-ACK object 440 also includes an activity count field 424 which contains the number of gates currently assigned to the subscriber identified in the subscriber ID field 422.

Figure 4F:
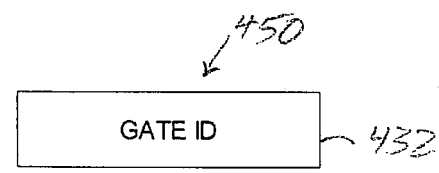

FIG. 4F is a block diagram of one embodiment of a GATE-INFO/DEL object 450. GATE-INFO/DEL 450 is used for MR messages 400 that correspond to a GATE- INFO and GATE-DELETE message sent from the COPS client 154 to the gate manager 160 and for MR messages 400 that correspond to a GATE-DEL-ACK message sent from the gate manager 160 to the COPS client 154. The GATE-INFO/DEL object 450 includes a gate ID field 432 that contains the gate ID of the gate referenced by the message.

Figures 4G, 4H:
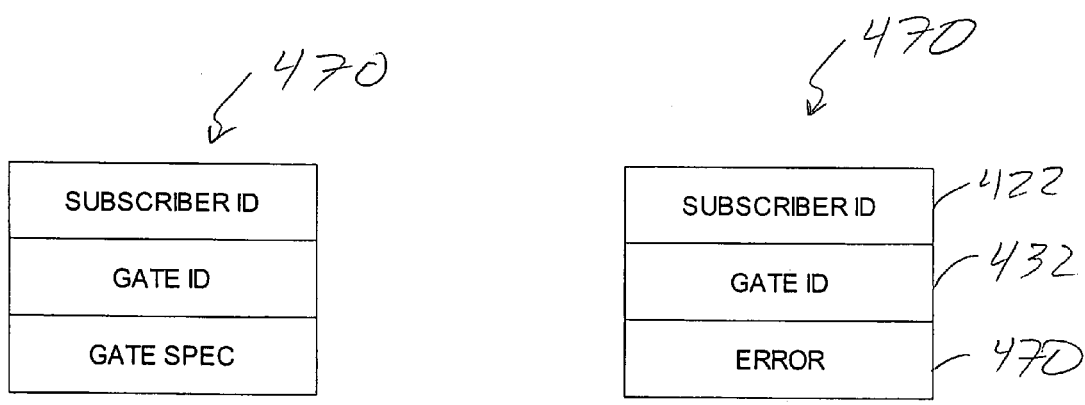

FIG. 4G is a block diagram of one embodiment of a GATE-INFO-ACK object 460. GATE-INFO-ACK object 460 is used for MR messages 400 that correspond to a GATE-INFO-ACK message, which are sent by the gate manager 160 to the COPS client 154. The GATE-INFO-ACK object 460 includes a subscriber ID field 422 that identifies the subscriber associated with the message. The GATE-INFO-ACK object 460 also includes a gate ID field 432 that contains the gate ID referenced by the message. The GATE-INFO-ACK object 460 also includes a gate spec filed 434 containing the gate spec information for the gate ID identified in the gate ID field 432.

FIG. 4H is a block diagram of one embodiment of an ERROR object 470. ERROR object 470 is used for MR messages 400 that correspond to an error message, such as a GATE-ALLOC-ERR, GATE-SET-ERR, GATE-INFO-ERR, or GATE-DELETE-ERR message. Such error messages are sent from the gate manager 160 to the COPS client 154. The error object 470 includes a subscriber ID field 422 that identifies the subscriber associated with the message. The error object 470 also includes a gate ID field 432 that contains the gate ID referenced by the message. The error object 470 also includes an error field 436 that contains an error code that is used to indicate the type of error that has occurred.

Figure 5A:
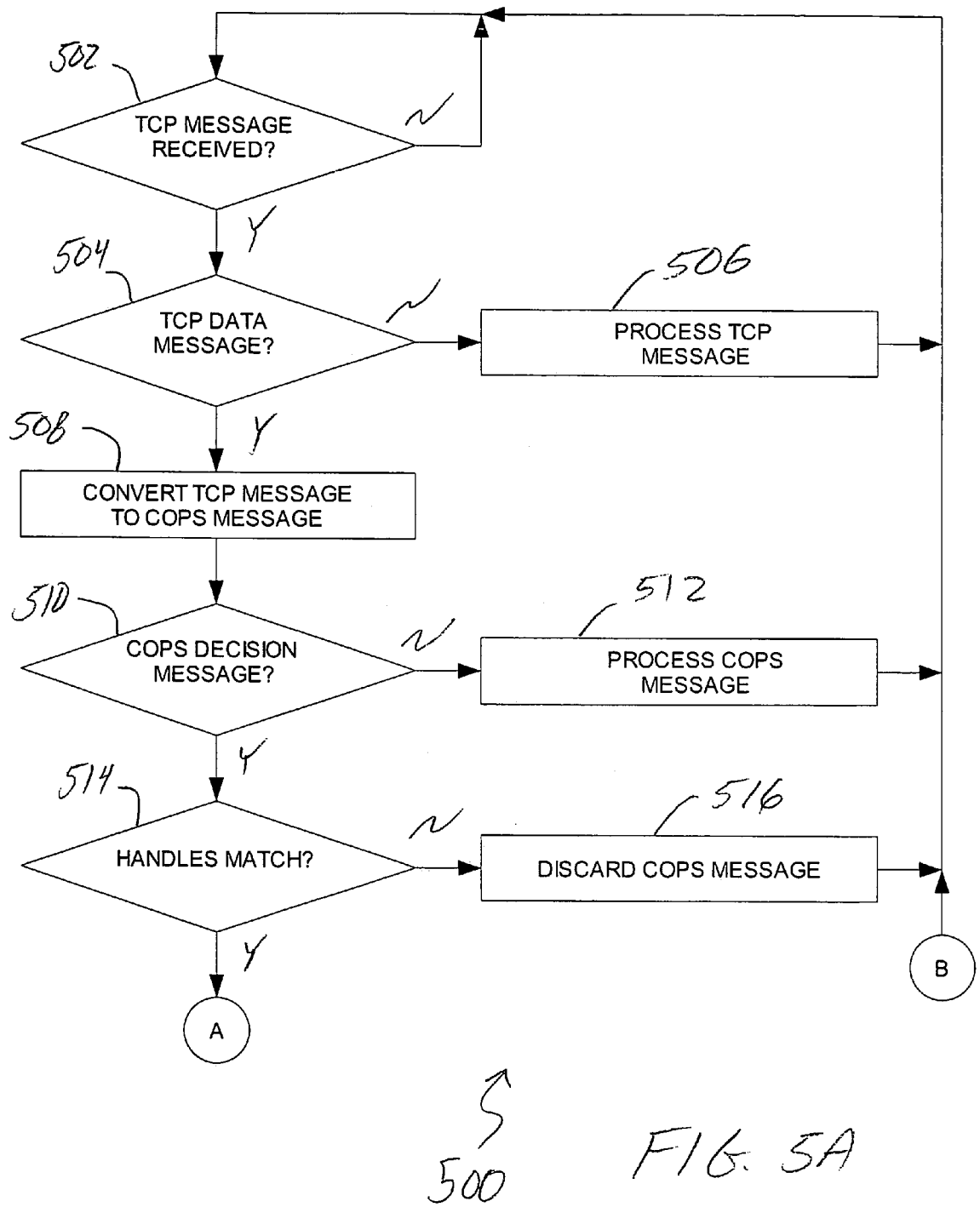
FIGS. 5A-5B are a flow diagram of one embodiment of a method of processing COPS messages.
Figure 5B:
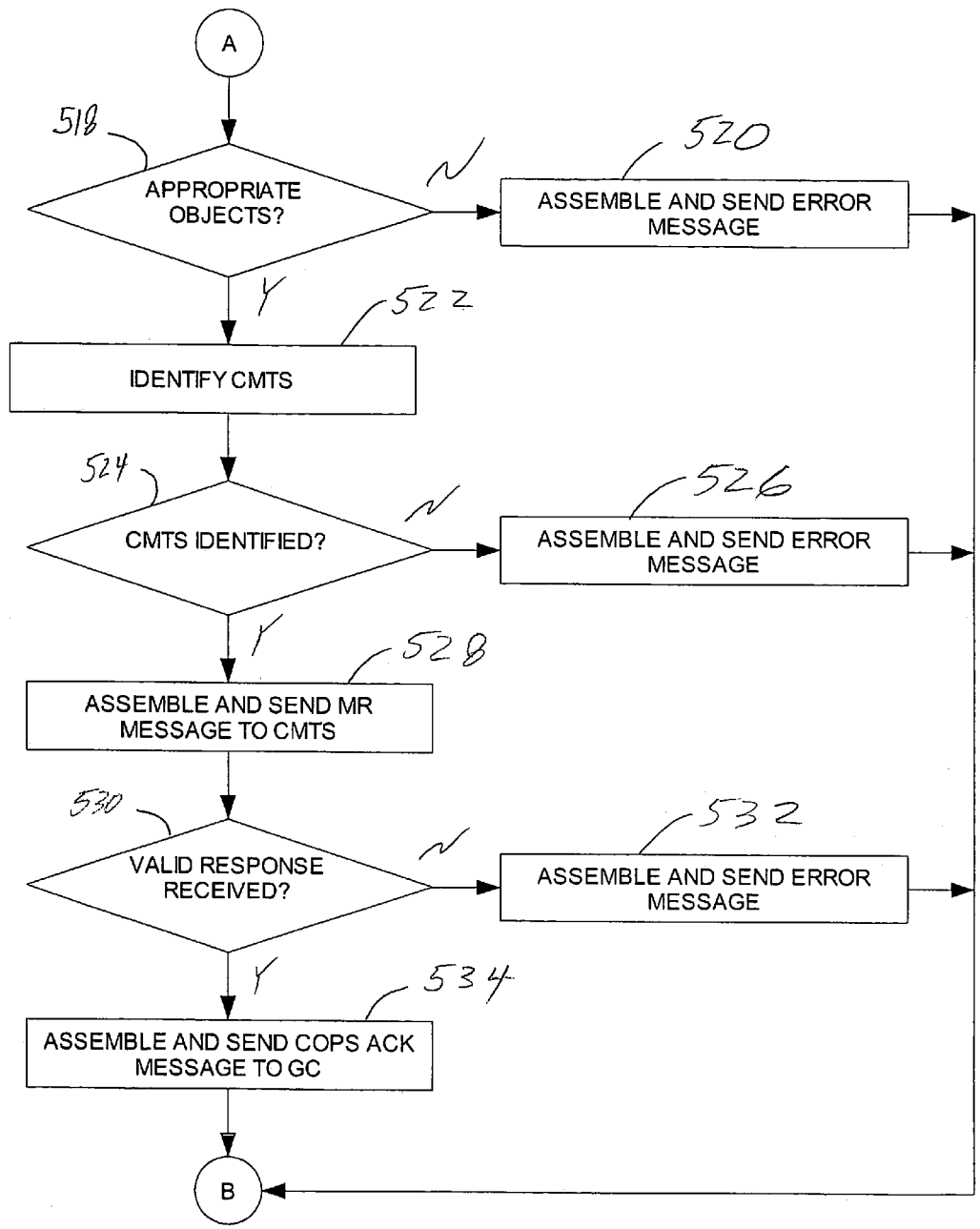

FIGS. 5A-5B are a flow diagram of one embodiment of a method 500 of a processing COPS messages. Embodiments of method 400 are suitable for use with PACKETCABLE networks. The embodiment shown in FIG. 5 is implemented using the embodiment of a COPS client 154 shown in FIG. 1 and is suitable for use in the embodiment of a cable network 100 shown in FIG. 1. The COPS client 154 listens on port 2126 for TCP messages. When a TCP message is received (checked in block 502 shown in FIG. 5A), the type of the TCP message is determined. Only the processing for TCP data messages is shown in detail in FIG. 5. If the TCP message is of a type other than the TCP data message (checked in block 504), the TCP message is processed by the COPS client 154 in accordance with the PACKETCABLE specification (block 506). For example, if the TCP message is a TCP open message, a TCP connection is opened and the associated data structures are allocated and initialized as required by the PACKETCABLE specifications. If the TCP message is a TCP close message, the TCP connection referenced by that TCP message is closed and the associated data structures are cleared. Such other processing includes the processing of TCP timeouts and keep alive time outs. COPS messages sent between the gate controller 126 and the COPS client 154 are sent a TCP messages. In one embodiment, each such TCP message is sent without any handshaking. In other words, one-way messaging is used for TCP messages in such an embodiment. Such an approach is suitable where the underlying transport layer has a relatively high degree of reliability. This will typically be the case for in a PACKETCABLE network. This results in a reduction in the amount of TCP messages that are sent for any given transmission. In one embodiment, the transport layer attempts to transmit each packet three times before determining that a failure has occurred (that is, that TCP transmission has timed out). After such other processing is performed, the method 500 waits for the next TCP message (looping back to block 502).

If the TCP message is a TCP data message, the TCP message is converted into a COPS message (block 508). Only the processing for COPS decisions messages (that is, COPS messages having an op-code field 308 indicates that a DECISION operation is to be performed) is shown in detail in FIG. 5. If the COPS message is a COPS decision message (checked in block 510), the COPS message is processed by the COPS client 154 in accordance with the PACKETCABLE specification (block 512). For example, the COPS client 154 sends a Client Open COPS message to the gate controller 126 to initiate a COPS connection with the GC 126, and the GC 126 responds with a Client Accept COPS message to accept the COPS connection. The gate controller 126 sends a Client Close COPS message to the COPS client 154, which terminate the COPS connection by sending a TCP close message to the GC 126. Such other processing includes, for example, processing Keep Alive COPS messages. After such other processing is performed, the method 500 waits for the next TCP message (looping back to block 502).

If the COPS message is a decision COPS message, it is determined if the handle for the current COP session matches the handle included in the COPS message (checked in blocked 514). If the handles do not match, the COPS message is discarded (block 516). If the handles match, it is determined if the appropriate object types are included in the COPS message for the type of gate command specified in the gate command field 354 of the transaction (checked in block 518 shown in FIG. 5B). For example, for a GATE-ALLOC command or a GATE-SET command, a transaction ID COPS object and a subscriber ID COPS object are expected to be included in the COPS message. An activity count COPS object and a gate ID COPS object are optional. For a GATE-INFO or a GATE-DELETE command, a transaction ID COPS object and a gate ID COPS object. If any of the expected COPS objects are not included in the COPS message, an appropriate error message is assembled by the COPS client 154 and sent to the GC 126 (block 520). For example, for GATE-ALLOC, GATE-SET, GATE-INFO, and GATE-DELETE commands, GATE-ALLOC-ERROR, GATE-SET-ERROR, GATE-INFO-ERROR, and GATE-DELETE-ERROR COPS messages, respectively, are assembled with the COPS objects specified in the PACKETCABLE specification and sent. After the error message is sent, the method 500 waits for the next TCP message (looping back to block 502).

If all of the expected COPS objects are included in the COPS message, the CMTS 102 that processes gate commands for the subscriber specified in the subscriber ID COPS object or gate ID specified in the gate ID object is identified (block 522). For example, in one embodiment, if a gate ID has been generated in the manner described in connection with FIG. 2 and a gate ID COPS object is included in the COPS message, the slot number of the CMTS 102 that processes gate commands for that gate ID is retrieved from the first part 202 of the gate ID. Otherwise, in such an embodiment, where a gate ID has not been assigned, a route lookup for the CMTS 102 that processes gate commands for the subscribed ID specified in the COPS message is performed. If an appropriate CMTS 102 is not found (checked in block 524), an appropriate error message is assembled by the COPS client 154 and sent to the GC 126 (block 526). After the error message is sent, the method 500 waits for the next TCP message (looping back to block 502).

If an appropriate CMTS 102 is identified, a message relay message is assembled and sent to the identified CMTS 102 (block 528). A message relay message is formatted with the information described above in connection with FIGS. 4A-4H. The assembled message relay message is sent to the CMTS 102 (for processing by the gate manager 160 executing thereon) by the COPS client 154 (more specifically, by the message relay 156). In one embodiment, the message relay message is transmitted from the COPS client 154 to the CMTS 102 using the inter-chassis messaging mechanism used for other types of messages exchanged between systems housed within the integrated IP access switch 104. One embodiment of such a mechanism is described in co-pending U.S. patent application Ser. No. 09/474,039, filed Dec. 28, 1999, titled "System and Process for Direct, Flexible, and Scalable Switching of Data Packets in Broadband Networks" (the "'039 Application). The '039 Application is hereby incorporated herein by reference.

After the MR message is sent, the COPS client 154 waits to receive a valid response from the CMTS 102 to which the MR message was sent (checked in block 530). The response will be in the form of a MR message sent from the gate manager 160 of the CMTS 102 to the message relay 156 of the COPS client 154. If an improper response is received or if no response is received within a predetermined time period, an appropriate error message is assembled by the COPS client 154 and sent to the GC 126 (block 532). After the error message is sent, the method 500 waits for the next TCP message (looping back to block 502). In alternative embodiment (not shown in FIGS. 5A-5B), the COPS client 154 in route server 152 does not wait for any response CMTS 102 and does not start any timer. In such an embodiment, the COPS client 154 receives a message from the CMS 122 and relies on message relay 156 to deliver the message to a respective CMTS 102. If a route corresponding to the subscriber ID of that message is not present in the system, the message is not sent and the message relay 156 informs the COPS client 154 about it. In this situation COPS client 154 builds an appropriate error message and sends the error message to the CMS 122.

In the embodiment shown in FIGS. 5A-5B if a valid response is received, an appropriate acknowledgement COPS message is assembled by the COPS client 154 and sent by the COPS client 154 to the gate controller 126 (block 534). For example, for GATE-ALLOC, GATE-SET, GATE-INFO, and GATE-DELETE commands, GATE-ALLOC-ACK, GATE-SET-ACK, GATE-INFO-ACK, and GATE-DELETE-ACK COPS messages, respectively, are assembled with the COPS objects specified in the PACKETCABLE specification and sent. Information for the COPS objects are supplied in the received MR message. After the acknowledgement message is sent, the method 500 waits for the next TCP message (looping back to block 502).

Figure 6:
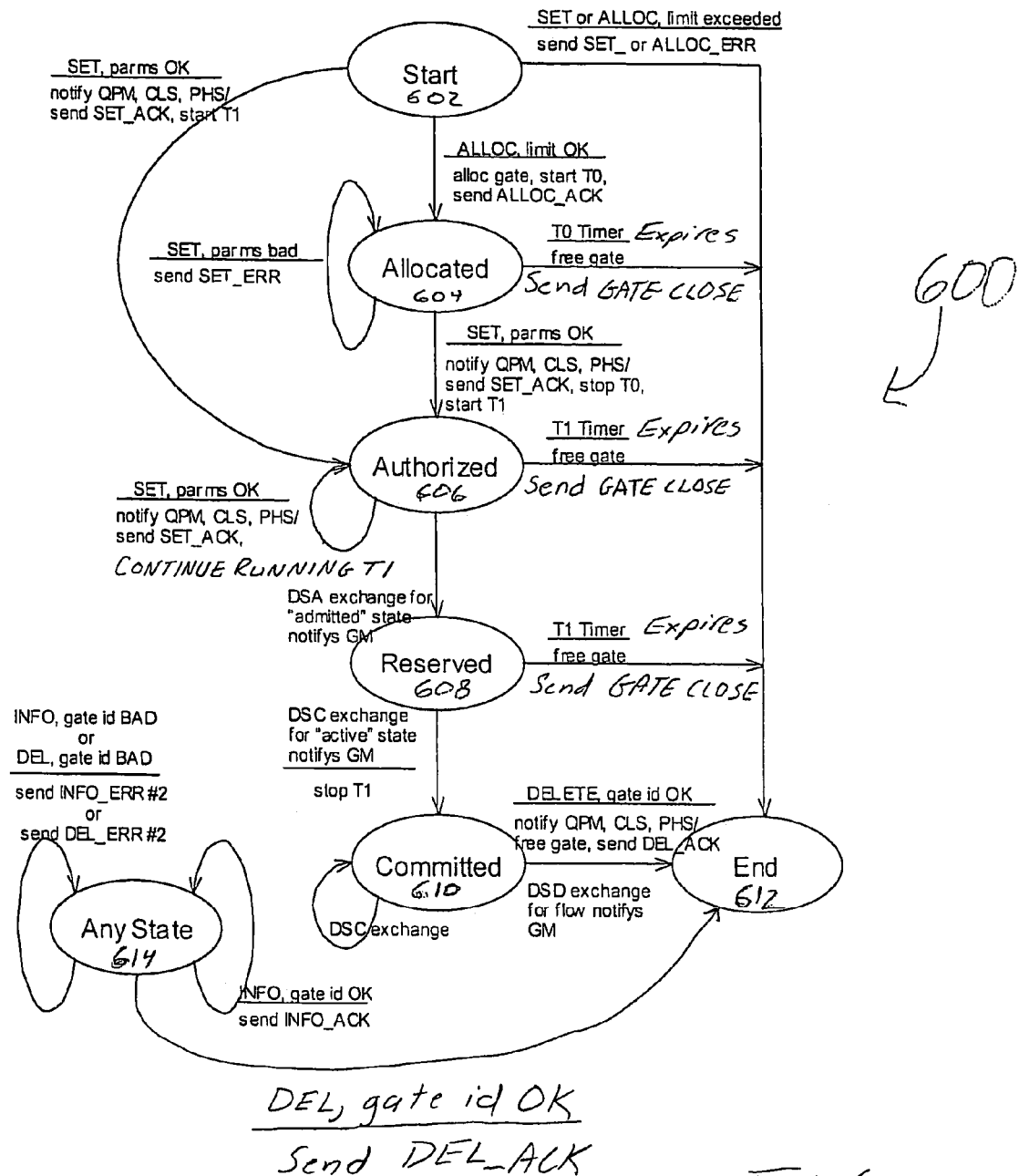
FIG. 6 is a diagram illustrating one embodiment of a state diagram that implements the gate transition functionality specified in the PACKETCABLE specification.

FIG. 6 is a diagram illustrating one embodiment of a state diagram 600 that implements the gate transition functionality specified in the PACKETCABLE specification. PACKETCABLE specifies required transitions among the four following states: an ALLOCATED state which is the initial state of a gate created at the request of the GC 126, an AUTHORIZED state in which the GC 126 has authorized the flow associated with the gate with resource limits defined, a RESERVED state in which resources have been reserved for the flow associated with the gate, and a COMMITTED state in which the resources for the flow are used. All gates (for example, upstream and downstream flows) assigned to the same gate ID by the gate manager 160 transition together through the states of the state machine 600, even if only one of the upstream/downstream flows is permitted to pass traffic. A separate instantiation of state machine 600 is created for each gate ID that is created. In the embodiment shown in FIG. 6, the state machine 600 is implemented as a part of the gate manager 160. However, as is described below, the actual reservation and commitment of flows and associated resources is performed by the QPM 162 and signaled to the gate manager 160 in order to transition the state machine 600 as needed.

Initially, the state machine 600 is in a START state 602. While the state machine 600 is in the START state 602, when the gate manager 160 receives from the COPS client 154 a MR message that has a message type of GATE-ALLOC (that is, a GATE-ALLOC MR message), the gate manager 160 verifies that the number of gates already allocated for the subscriber ID specified in the subscriber ID field 422 of the GATE-ALLOC MR message has not exceeded the gate limit for that subscriber ID (contained in the activity count field 424 of the GATE-ALLOC MR message, which is derived from an activity count object included in a corresponding GATE-ALLOC COPS message received by the COPS client 154). In some instances, the gate manager 160 does not check the number of gates already allocated. The gate controller 126, in such instances, does not include an activity count COPS object in the corresponding to GATE-ALLOC COPS message sent to the COPS client 154. In such a case, the activity count field 424 of the corresponding GATE-ALLOC MR message is not populated and the check is not performed. If the gate limit has not been exceeded or if the gate limit check is not be performed by the gate manager 160, the gate manager 160 allocates a gate and a locally unique gate ID (for example, as illustrated above in connection with FIG. 2), which is returned to the COPS client 154 in a GATE-ALLOC-ACK MR message. As noted above in connection with FIG. 5, the GATE-ALLOC-ACK MR message is received by the COPS client 154, which sends a GATE-ALLOC-ACK COPS message to the CMS 122 based on the received GATE-ALLOC-ACK MR message. The gate is marked as "in use" and the state machine 600 enters the ALLOCATED state 604.

A timer T0 is started when the state machine 600 enters the ALLOCATED state 604. Timer T0 is a countdown timer that is initialized with a predetermined initial period. Timer T0 limits the amount of time the gate ID will remain in the ALLOCATED state 604 without any specified gate parameters. If timer TO expires while the state machine 600 is in the ALLOCATED state 604, the gate is freed, the COPS client 154 sends a GATE-CLOSE COPS message to the CMS 122, and the state machine 600 enters an END state 612.

While the state machine 600 is in the START state 602, when the gate manager 160 receives a MR message that has a message type of GATE-SET (that is, a GATE-SET MR message), the gate manager 160, the gate manager 160 verifies that the number of gates already allocated for the subscriber ID specified in the subscriber ID field 422 of the GATE-SET MR message has not exceeded the gate limit for that subscriber ID contained in the activity count field 424 of the MR message. If the gate limit has not been exceeded, the gate manager 160 allocates a gate and a locally unique gate ID. The gate manager 160 also performs a gate set integrity check. For example, in one such embodiment, the gate set integrity check includes verifying that the gate limit is not exceeded, performing a range check on the flow direction field 414, checking that the T1 and T2 values match across all gate specs, and checking that there is at least one gate spec. The gate set integrity check also includes, when there are two gate specs, checking that the two gate specs have different directions.

If the number of gate already allocated for the subscriber ID exceeds the gate limit or if an error is discovered as a part of the gate set integrity check, a GATE-SET-ERROR MR message is sent by the gate manager 160 to the COPS client 154 specifying an appropriate error code in the error field 436 and the state machine 600 transitions to the END state 612.

If no such error is discovered, a GATE-SET-ACK MR message is sent from the gate manager 160 to the COPS client 154, which sends a GATE-SET-ACK COPS message to the CMS 122 based on the received MR message. Also, the state machine 600 enters the AUTHORIZED state 606. After the state machine 600 enters the AUTHORIZED state 606, the gate manager 160 starts a countdown timer T1. Also, the gate manager 160 notifies the QPM 162, the CLS 164, and the PHS 166 of the existence of the authorized gate. Notifying the QPM 162 allows the QPM 162 to watch for, receive, and properly respond to a DSA-Request message from the MTA 108. The timer T1 is initially set to a predetermined starting value. This timer can be provisioned in the CMTS. In case the timer is not provisioned, then the CMTS starts the timer based on the value specified in the GATE-SET message. Timer T1 limits the amount of time the authorization will remain valid without being committed.

While the state machine 600 is in the ALLOCATED state 604, when the gate manager 160 receives a MR message that has a message type of GATE-SET (that is, a GATE-SET MR message), the gate manager 160 performs a gate set integrity check. If an error is discovered as a part of the gate set integrity check, a GATE-SET-ERROR MR message is sent by the gate manager 160 to the COPS client 154 specifying an appropriate error code in the error field 436 and the state machine 600 remains in the ALLOCATED state 604.

If no such error is discovered, a GATE-SET-ACK MR message is sent from the gate manager 160 to the COPS client 154, which sends a GATE-SET-ACK COPS message to the CMS 122 based on the received MR message. Also, the TO timer is stopped and the state machine 600 enters the AUTHORIZED state 606. After the state machine 600 enters the AUTHORIZED state 606, the gate manager 160 starts the countdown timer T1. Also, the gate manager 160 notifies the QPM 162, the CLS 164, and the PHS 166 of the existence of the authorized gate.

While the state machine 600 is in the AUTHORIZED state 606, if a subsequent GATE-SET MR message is sent from the COPS client 154 to the gate manager 160 (in response to a GATE-SET COPS message from the CMS 122), the gate set integrity check is performed for the information supplied in the subsequent GATE-SET MR message. If an error is discovered by the gate set integrity check, a SET-ERR MR message is sent by the gate manager 160 to the COPS client 154 specifying an appropriate error code in the error field 436 and the state machine 600 remains in the AUTHORIZED state 606 and the timer T1 is not restarted. The COPS client 154, in such a case, sends a GATE-SET-ERR COPS message to the CMS 122 based on the information supplied in the SET-ERR MR message.

If no such error is discovered, a GATE-SET-ACK MR message is sent from the gate manager 160 to the COPS client 154, which sends a GATE-SET-ACK COPS message to the CMS 122 based on the received MR message. Also, the state machine 600 remains in the AUTHORIZED state 606 and the T1 timer continues to run.

While the state machine 600 is in the AUTHORIZED state 606, it is expected that the MTA 108 will attempt to reserve resources at some point prior to the expiration of the timer T1. The MTA 108 does this by exchanging DOCSIS 1.1 Dynamic Service Add, (DSA) messages with the DSX 165 (that is, DSA Request, DSA Response, and DSA Acknowledgement messages).

If timer T1 expires while the state machine 600 is in the AUTHORIZED state 606, the gate manager 160 frees the resources associated with the gate ID, sends a GATE-CLOSE MR message to the COPS client 154, and the state machine 600 enters an END state 612.

When the DSX 165 receives a DSA Request message from the MTA 108, the QPM 162 inspects the authorization block of the DSA Request. The gate ID for the gate is encoded in the authorization block. The QPM 162 performs the admission control for the flows associated with that gate ID. If QPM 162 admits the flows associated with that gate ID, the QPM 162 reserves appropriate QOS resources for the flows. In other words, the flows are reserved but not yet available for the MTA 108 to use. This includes having the CLS 164 add an appropriate classifier for the flows and the PHS 166 add an appropriate PHS rule for the flows. A DSA Response message is sent from the DSX 165 to the MTA 108, which in return sends a DSA Acknowledgement message back to the DSX 165. Then, QPM 162 signals to the gate manager 160 that the flows have been admitted. The gate manager 160 causes the state machine 600 to enter the RESERVED state 608. If the QPM 162 does not admit the flow, the DSX 165 does not send a DSA Response message to the MTA 108 and the state machine 600 remains in the AUTHORIZED state 606. As noted above, if the timer T1 expires while the state machine 600 remains in the AUTHORIZED state 606, the gate manager 160 frees the gate, sends a GATE-CLOSE MR message to the COPS client 154, and the state machine 600 enters an END state 612.

While the state machine 600 is in the RESERVED state 608, it is expected that the MTA 108 will attempt to commit the reserved resources at some point prior to the expiration of the timer T1. The MTA 108 does this by exchanging DOCSIS 1.1 Dynamic Service Change (DSC) messages with the DSX 165 (that is, DSC Request, DSC Response, and DSC Acknowledgement messages). If timer T1 expires while the state machine 600 is in the RESERVED state 608, the gate manager 160 frees the resources associated with the gate ID, sends a GATE-CLOSE MR message to the COPS client 154, and informs the QPM 162 to send a DSD message and the state machine 600 enters an END state 612.

When the DSX 165 receives a DSC Request message from the MTA 108, the QPM 162 commits the reserved QOS resources so that the MTA 108 is free to use the flow. If the QPM 162 successfully commits the QOS resources, the DSX 165 then sends a DSC Response to the MTA 108, which the MTA 108 responds to by sending to the DSX 165 a DSC Acknowledgement after receipt of the DSC-Response message. The QPM 162 signals to the gate manager 160 that the flow associated with the gate ID has been activated. The gate manager 160 stops the timer T1 timer. Then, gate manager 160 causes the state machine 600 to enter the COMMITTED state 610. If the QPM 162 is unable to commit the QOS resources, the DSX 165 does not send a DSC Response message to the MTA 108 and the state machine 600 remains in the RESERVED state 608. As noted above, if the timer T1 expires while the state machine 600 remains in the RESERVED state 608, the gate manager 160 frees the resources associated with the gate ID, sends a GATE-CLOSE MR message to the COPS client 154, and the state machine 600 enters an END state 612.

In the embodiment shown in FIG. 6, if, while the state machine 600 is in the COMMITTED state 610, the DSX 165 and MTA 108 engage in a subsequent exchange of DSC Request, DSC Response, and DSC Acknowledgement messages, the QPM 162 modifies the underlying flows associated with that gate ID based on the DSC Request message. The state machine 600 remains in the COMMITTED state 610.

While the state machine 600 is in the COMMITTED state 610, when the users complete the call and hang-up, the MTA 108 sends a Dynamic Service Delete (DSD) Request message to the DSX 165. The DSX 165 receives the DSD Request message. In response, the QPM 162 deletes the underlying flows associated with the gate ID, and the other DOCSIS 1.1 subsystems free the resources allocated for that gate ID. The DSX 165 sends a DSD Response message to the MTA 108, to which the MTA 108 responds by sending to the DSX 165 a DSD Acknowledgement after receipt of the DSD-Response message. The QPM 162 notifies the gate manager 160 of the deletion of the underlying flows and the gate manager 160 causes the state machine 500 to enter the END state 612.

While the state machine 600 is in any state (shown with by the ANY STATE state 614 in FIG. 6), when the gate manager 160 receives a MR message that has a message type of GATE-INFO (that is, a GATE-INFO MR message) from the COPS client 126, the gate manager 160 determines if a valid gate ID has been included with the message. If a valid gate ID is included with the received message, the gate manager 160 responds to the message by sending a GATE-INFO-ACK MR message to the COPS client 126. If the gate ID is invalid, an error message (for example, a GATE-INFO-ERR MR message) is sent from the gate manager 160 to the COPS client 126. In both cases, the state machine 600 remains in the same state.

While the state machine 600 is in any state (shown with by the ANY STATE state 614 in FIG. 6), when the gate manager 160 receives a MR message that has a message type of GATE-DEL from the COPS client 126 (that is, a GATE-DEL MR message), the gate manager 160 determines if a valid GATE ID has been included with the message. If a valid GATE ID is included with the received message, the gate manager 160 frees the gate by notifying the appropriate DOCSIS subsystems and stopping any timers, if necessary. The gate manager 160 sends a GATE-DEL-ACK MR message to the COPS client 126. The state machine 600 then enters the END state 612. If the GATE ID is invalid, an error message (for example, a GATE-DEL-ERR MR message) is sent from the gate manager 160 to the COPS client 126 and the state machine 600 remains in the same state.

By having the DOCSIS 1.1. subsystem (for example, the QPM 162 and DSX 165) process the DSX messages (DSA, DSC, and DSD) messages prior to having the gate manager 160 change the state of the associated gate, improper state transitions can be avoided. Moreover, embodiments of state machine 600 virtualize the management of the state of a gate. In other words, the state machine 600 is implemented on top of the underlying DOCSIS 1.1 subsystem, which manages the underlying flows associated with the gate. This, in some situations, reduces the amount of changes necessary to implement the PACKETCABLE functionality on top of an existing DOCSIS 1.1 code base.

Those skilled in the art will recognize that the techniques and methods described here are implemented, in some embodiment, by programming a programmable processor (for example, a microprocessor included on a route server, CMTS, or other device) with appropriate instructions to implement the functionality described here. In such embodiments, such program instructions are stored in a suitable memory device (for example, read-only memory and/or random-access memory) from which the program instructions are retrieved during execution. Also, suitable data structures are stored in memory in such embodiments. For example, in one such embodiment, the techniques and methods described here are implemented by programming one or more of the processors described in the '039 Application.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A cable modem termination system comprising:
   a data over cable service interface specification subsystem that manages a flow associated with a gate; and
   a gate manager that manages a state of the gate;
   wherein when the flow is admitted by the data over cable service interface specification subsystem, the data over cable service interface specification subsystem signals to the gate manager to transition the state of the gate to a reserved state;
   wherein the gate manager transitions the state of the gate to the reserved state when the data over cable service interface specification subsystem signals to the gate manager to transition the state of the gate to the reserved state;
   wherein when the flow is activated by the data over cable service interface specification subsystem, the data over cable service interface specification subsystem signals to the gate manager to transition the state of the gate to a committed state; and
   wherein the gate manager transitions the state of the gate to the committed state when the data over cable service interface specification subsystem signals to the gate manager to transition the state of the gate to the committed state.

2. The cable modem termination system of claim 1, wherein when the flow is deleted by the data over cable service interface specification subsystem, the data over cable service interface specification subsystem signals to the gate manager to transition the state of the gate to an end state.

3. The cable modem termination system of claim 1, wherein when the gate manager receives a message from a common open policy service client executing on a route server that is derived from a GATE ALLOC common open policy service message received by the common open policy service, the gate manager transitions the state of the gate to an allocated state.

4. The cable modem termination system of claim 3, wherein when the gate manager receives the message from the common open policy service client, the gate manager transitions the state of the gate to the allocated state if a gate limit associated with a subscriber is not exceeded.

5. The cable modem termination system of claim 1, wherein when the gate manager receives a message from a common open policy service client executing on a route server that is derived from a GATE SET common open policy service message received by the common open policy service, the gate manager transitions the state of the gate to an authorized state.

6. The cable modem termination system of claim 1, wherein the data over cable service interface specification subsystem includes a quality of service policy manager that performs admission control for the flow.

7. The cable modem termination system of claim 1, wherein the data over cable service interface specification subsystem includes a quality of service signaling mechanism that receives dynamic service add and dynamic service change messages.

8. The cable modem termination system of claim 1, wherein the data over cable service interface specification subsystem admits the flow after the quality of service signaling mechanism receives a dynamic service add message.

9. The cable modem termination system of claim 1, wherein the data over cable service interface specification subsystem activates the flow after the quality of service signaling mechanism receives a dynamic service-change message.

10. A method of managing the state of a gate, comprising:
admitting a flow by a data over cable service interface specification subsystem, wherein the flow is associated with a gate;
signaling that the data over cable service interface specification subsystem has admitted the flow;
transitioning the state of the gate to a reserved state in response to signaling that the data over cable service interface specification subsystem has admitted the flow;
activating the flow by the data over cable service interface specification subsystem;
signaling that the data over cable service interface specification subsystem has activated the flow; and
transitioning the state of the gate to a committed state in response to signaling that the data over cable service interface specification subsystem has activated the flow.

11. The method of claim 10, further comprising:
deleting the flow by the data over cable service interface specification subsystem;
signaling that the data over cable service interface specification subsystem has deleted the flow; and
transitioning the state of the gate to an end state in response to the signaling that the data over cable service interface specification subsystem has deleted the flow.

12. The method of claim 10, further comprising:
receiving a message, from a common open policy service client executing on a route server, that is derived from a GATE ALLOC common open policy service message received by the common open policy service; and
transitioning the state of the gate an allocated state when the message is received.

13. The method of claim 12, wherein transitioning the state of the gate the allocated state when the message is received includes the state of the gate the allocated state if a gate limit associated with a subscriber is not exceeded.

14. The method of claim 10, further comprising:
receiving a message from a common open policy service client executing on a route server that is derived from a GATE SET common open policy service message received by the common open policy service; and
transitioning the state of the gate an authorized state when the message is received.

15. The method of claim 10, wherein the data over cable service interface specification subsystem admits the flow after a quality of service signaling mechanism receives a dynamic service add message.

16. The method of claim 10, wherein the data over cable service interface specification subsystem activates the flow after a quality of service signaling mechanism receives a dynamic service change message.

17. An access switch comprising:
at least one cable modem termination system, wherein the cable modem termination system, when coupled to a hybrid-fiber coaxial cable network, is in communication with a media terminal adapter, wherein the cable modem termination system includes a gate manager executing thereon;
a route server, in communication with the cable modem termination system, that includes a common open policy service client executing on the route server;
a network interface module, in communication with the cable modem termination system and the route server, that, when the network interface module is coupled to a network, communicates common open policy service messages between the common open policy service client and a call management server included in the network;
wherein the cable modem termination system includes:
a data over cable service interface specification subsystem that manages a flow associated with a gate; and
a gate manager that manages a state of the gate;
wherein when the flow is admitted by the data over cable service interface specification subsystem, the data over cable service interface specification subsystem signals to the gate manager to transition the state of the gate to a reserved state;
wherein the gate manager transitions the state of the gate to the reserved state when the data over cable service interface specification subsystem signals to the gate manager to transition the state of the gate to the reserved state;
wherein when the flow is activated by the data over cable service interface specification subsystem, the data over cable service interface specification subsystem signals to the gate manager to transition the state of the gate to a committed state; and wherein the gate manager transitions the state of the gate to the committed state when the data over cable service interface specification subsystem signals to the gate manager to transition the state of the gate to the committed state.

18. The access switch of claim 17, wherein when the flow is deleted by the data over cable service interface specification subsystem, the data over cable service interface specification subsystem signals to the gate manager to transition the state of the gate to an end state.

19. The access switch of claim 17, wherein when the gate manager receives a message from a common open policy service client executing on a route server that is derived from a GATE ALLOC common open policy service message received by the common open policy service, the gate manager transitions the state of the gate to an allocated state.

20. The access switch of claim 19, wherein when the gate manager receives the message from the common open policy service client, the gate manager transitions the state of the gate to the allocated state if a gate limit associated with a subscriber is not exceeded.

21. The access switch of claim 17, wherein when the gate manager receives a message from a common open policy service client executing on a route server that is derived from a GATE SET common open policy service message received by the common open policy service, the gate manager transitions the state of the gate to an authorized state.

22. The access switch of claim 17, wherein the data over cable service interface specification subsystem includes a quality of service policy manager that performs admission control for the flow.

23. The access switch of claim 17, wherein the data over cable service interface specification subsystem includes a quality of service signaling mechanism that receives dynamic service add and dynamic service change messages.

24. The access switch of claim 17, wherein the data over cable service interface specification subsystem admits the flow after the quality of service signaling mechanism receives a dynamic service add message.

25. The access switch of claim 17, wherein the data over cable service interface specification subsystem activates the flow after the quality of service signaling mechanism receives a dynamic service change message.

* * * * *